United States Patent Office 2,748,818
Patented June 5, 1956

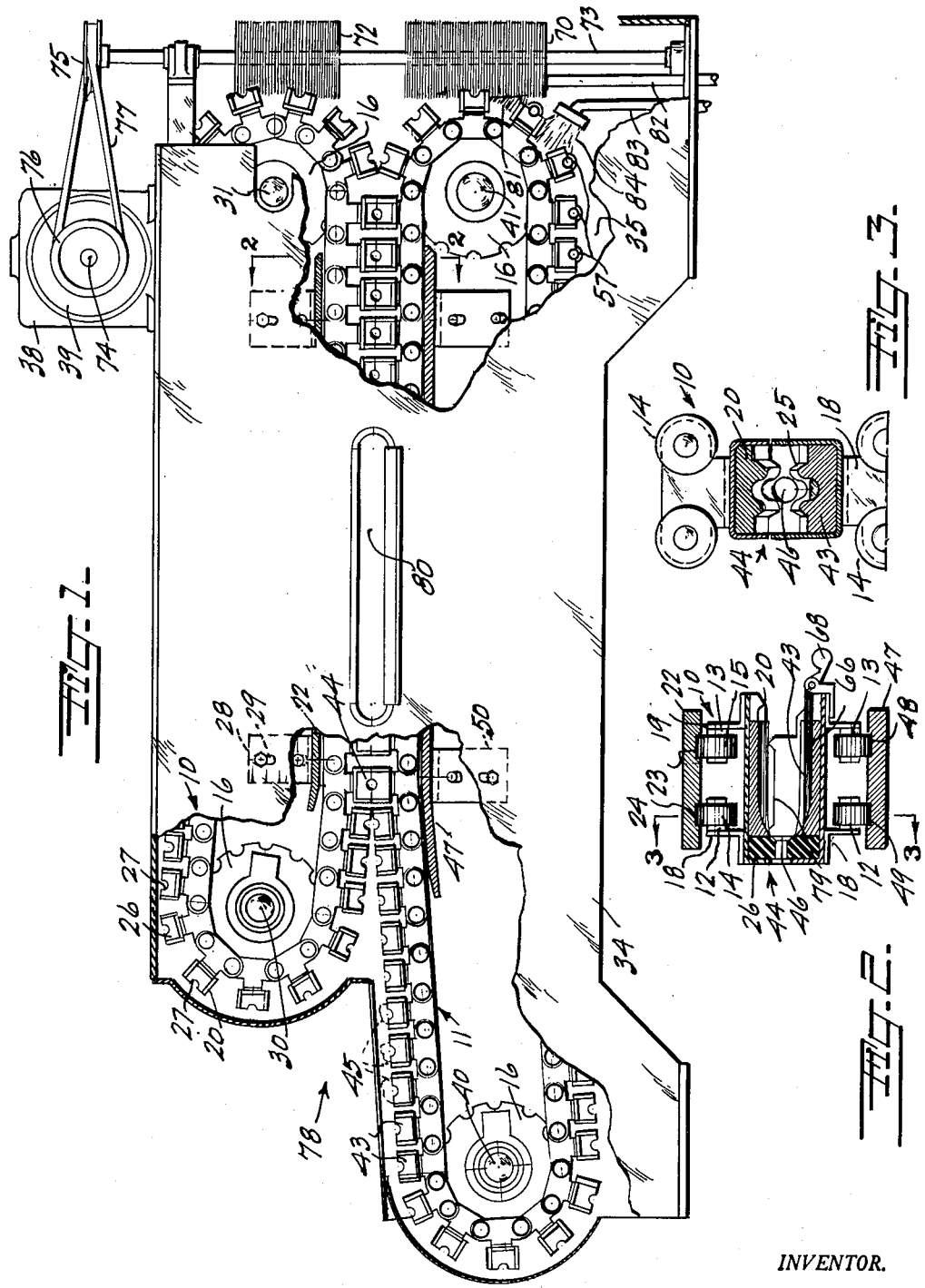

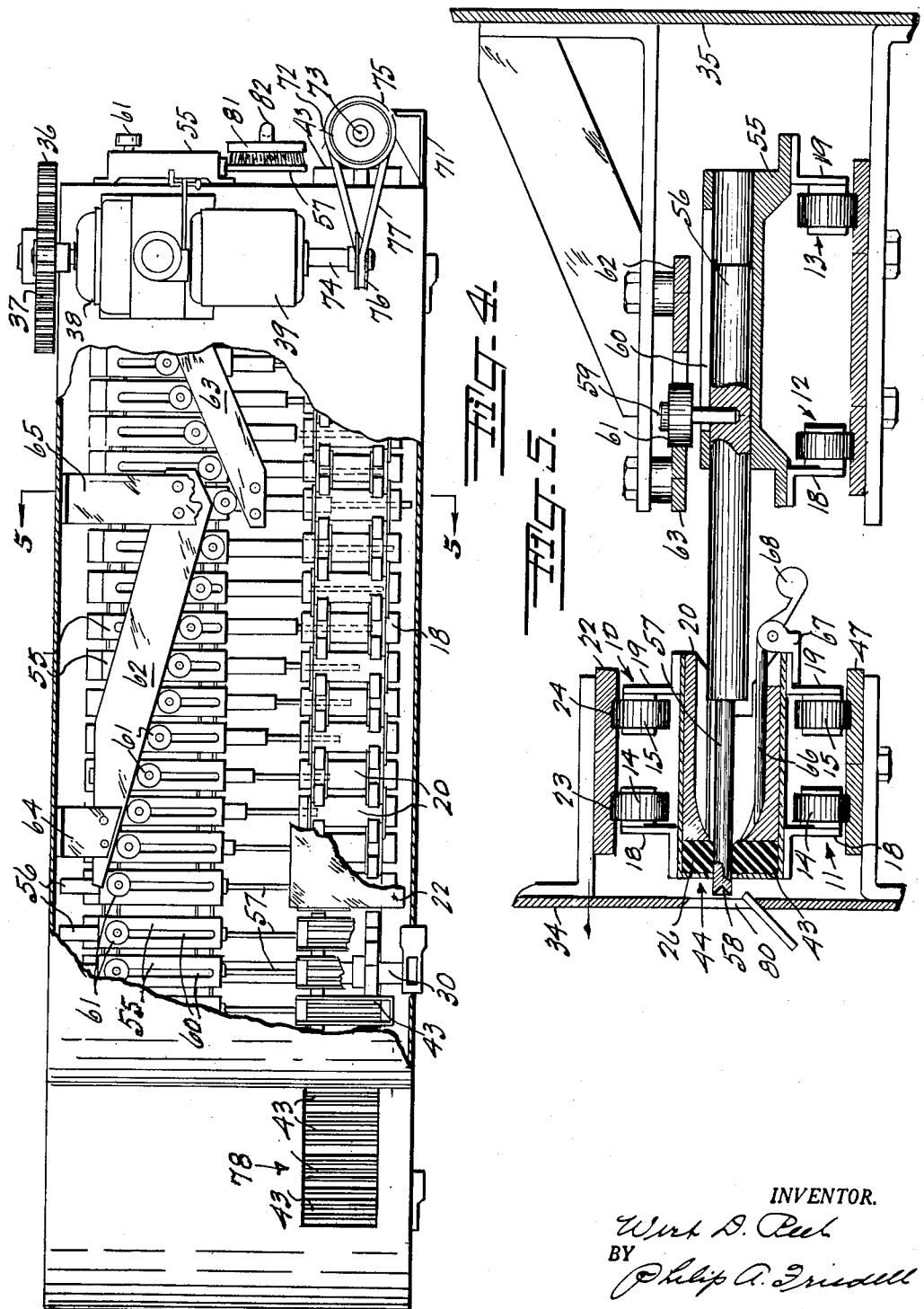

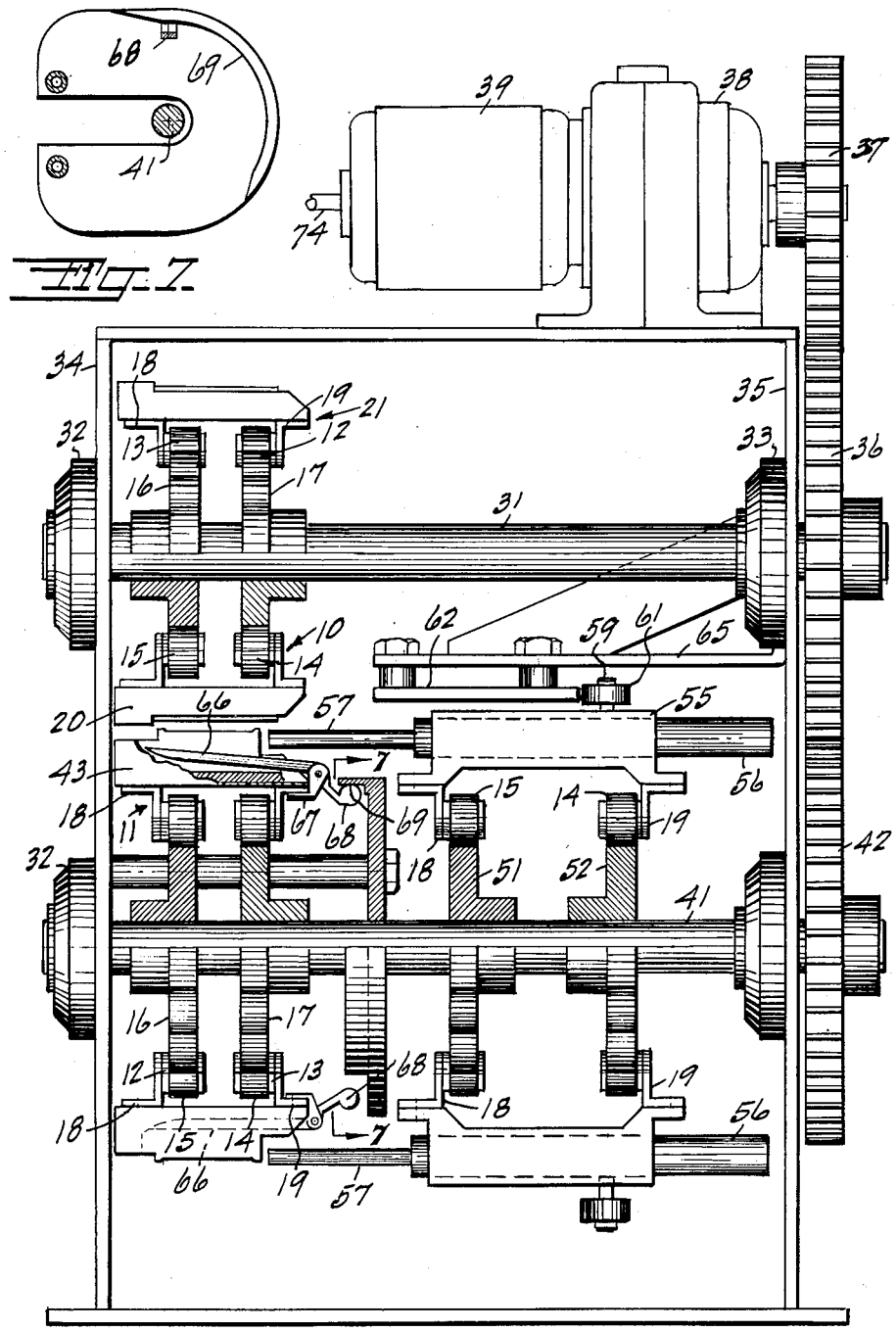

2,748,818

FRUIT PITTER HAVING TWO COOPERATING ENDLESS FRUIT CARRIERS AND AN ENDLESS PLUNGER CARRIER

Wirt D. Peel, Oakland, Calif.

Application April 8, 1955, Serial No. 500,236

20 Claims. (Cl. 146—17)

This invention relates to means for pitting fruit, particularly dried prunes and dates, though it can also be arranged for pitting other types of fruits.

It is known that there are a number of different types of fruit pitting machines, but so far as known, all appear to have some deleterious effect on the fruit, such as breaking the pit whereby a portion of the pit is left in the fruit; unnecessarily tearing or rupturing the fruit; having a low rate of production or requiring special care in loading the fruit, all of which faults have been overcome by this invention by suitably centering the pit for axial alignment with the pitting plunger, cupping the end of the pitting plunger, and operating the pitting plunger at a relatively low speed while obtaining high speed production of the pitted fruit, and arranging the machine so that the fruit is fed into the machine from an accessible position after which all further operations are automatically carried out with the pits segregated from the fruit.

This machine grips the fruit, centers the pit, forces the pit out of the fruit at one point, and removes the fruit at another point. The plungers are operating simultaneously on about a dozen fruits in follow relation, providing a slow and consequently non-crushing and non-rupturing removal of the pit.

The objects and advantages of the invention are as follows:

First, to provide a machine for removing the pits from fruit which will pit fruits at a maximum rate of production while actually removing the pits by a slow non-rupturing process.

Second, to provide a machine as outlined which removes the pits from a relatively large number of fruits simultaneously in follow relation through relatively slow movement of an equal number of pitting plungers in follow relation.

Third, to provide a machine as outlined with holders for the fruit and consisting of a nest and a cap which grip the fruit and simultaneously center the pit in axial alignment with the pitting plunger.

Fourth, to provide a machine as outlined in which the cap in separated from the nest following the pitting operation, and providing the nest with means for lifting the pitted fruit out of the nest for discharge.

In describing the invention reference will be had to the accompanying drawings, in which:

Fig. 1 is a side elevation of the invention with portions of the side wall broken away and the structure shown partly in section.

Fig. 2 is a longitudinal section through one of the fruit holders and the mounting and transport means therefor.

Fig. 3 is a section taken on line 3—3 of Fig. 2.

Fig. 4 is a top plan view of the invention with portions of the top wall broken away to clearly disclose the pitting operation.

Fig. 5 is an enlarged section taken on line 5—5 of Fig. 4.

Fig. 6 is an enlarged elevation of the discharge end of the machine, partly shown in section, and with the fruit discharging brushes removed.

Fig. 7 is a front elevation of the fruit lifting finger operating cam.

The invention includes an upper chain 10 and a lower chain 11, each consisting of two strands 12 and 13 of roller chain having rollers 14 and 15 and operating over spaced sprockets 16 and 17 at the respective ends of the machine, the two strands of each chain having each a laterally projecting bracket as indicated at 18 and 19.

The fruit holders or nests each include a body and a cap which are substantially identical. The nest caps 20 span the two strands of the upper chain and are fixed to the brackets 14 and 15 thereby forming the two strands into a single chain 21, these nest caps being mounted on each link.

A combined holddown and guide 22 has two grooves 23 and 24 formed in the underside for cooperation with the projecting portions of the rollers for maintaining the chain against lateral thrust and the caps in perfect alignment. These caps are provided with longitudinal ribs interiorly as indicated at 25, the ribs and intervening recesses being rounded to grip into the body of the fruit without rupturing the skin of the fruit, and the pit ejection end converges in conformity with the normal end shape of a fruit such as a prune or date.

A half diaphragm 26 is mounted in the ejection end and is removable and replaceable at will and is formed of resilient material and provided with a semi-cylindrical pit ejection recess 27.

Suitable adjustment of the support brackets 28 for the combined holddown and guide 22 is provided as indicated at 29.

The sprockets for the upper chain are mounted on the respective shafts 30 and 31, these shafts being rotatably mounted in the bearings 32 and 33 at the respective ends of the housing and are mounted on the front and rear housing walls 34 and 35.

Driving means is illustrated as consisting of a spur gear 36 which is fixed on the rear end of the shaft 31 exteriorly of the rear housing wall, and this gear meshes with a pinion 37 which is driven by a motor 38 at a suitable speed through a speed reducer 39.

The lower chain 11 is formed identical with the upper chain, with the spaced sprockets 16 and 17 being fixed on the feed and discharge end shafts respectively 40 and 41, and which shafts are mounted similarly to the shafts for the upper chain, with the shaft 41 having a gear 42 of the same diameter and meshing with the gear 36 to drive the adjacent strands of the upper and lower chains in the same direction and at the same speed, and in alignment with each other.

This lower chain has the nest bodies 43 spanning the twin strands and fixed to the brackets, these nest bodies being similarly formed to the nest caps whereby, when the nest body and cap cooperate as indicated at 44, the fruit 45 is gripped, with the ridges forced into the sides of the fruit to center the pit with the passage 46 formed by the two semi-cylindrical recesses in the ejection ends of the nest caps and bodies for retention of the body of the fruit while the pit is being ejected.

This lower chain has a support and guide for its upper strand as indicated at 47, with the rollers 14 and 15 rolling in the rectangular grooves 48 and 49, supporting the unit against lateral thrust during the pitting operation. This support and guide is supported by brackets 50 which are adjustable to bring the nest cap and body into positive engagement for the pitting operation.

The feed end sprockets for the lower chain are located in an extended position relative to the feed end sprockets for the upper chain, as shown in Fig. 1, to provide unrestricted access for feeding the individual fruits into the nest bodies as the chain travels toward the pitting position, and the axis of the feed end sprockets of the lower chain is also located in a plane below the plane of the discharge end sprockets for easier feeding and to angularly converge the nest bodies and caps into engagement at a slight angle to prevent damaging or marring of the fruit, and which might occur if the nests were assembled as the cap approaches its lower terminal of travel about the front of the sprocket.

Mounted on each of the lower chain sprocket shafts 40 and 41 are two additional spaced sprockets 51 and 52 over which operate twin strands of the previously described upper and lower chain strands, and having a pitting plunger housing 55 spanning the brackets 18 and 19 of each of the pairs of links of the twin chains and fixed thereto, forming the two strands into a single chain.

A plunger 56 is slidable in the housing 55 and terminates in the pitting plunger 57 which has a cupped end as indicated at 58 to engage over the end of and center the pit end for direct ejection through the passage 46.

A shaft 59 has one end fixed in the plunger 56 and projects radially through a slot 60 formed through the top wall of the housing 55, and has a roller 61 rotatable on its upper end for cooperation with the respective cams 62 and 63, which are angularly related in opposition to the path of the chain, these cams being supported from the rear wall 35 by the brackets 64 and 65.

Each nest body is provided with a lifting finger 66 which is hinged to a bracket 67 which in turn is fixed to one of the ears 18, and a lever arm 68 is integral with the finger and cooperates with the inside cam 69 as the chain is carried about the sprockets at the discharge end of the machine, the lever arm being depressed and thus raising the finger to lift the fruit clear of the ridges. As the nest body with its fruit reaches approximately the midpoint in its travel about the discharge end sprocket, the brush 70 sweeps the fruit toward the front of the machine where a suitable receiver 71 is provided. A second brush 72 is provided on the same shaft 73 for cleaning the nest caps as they pass upward, and these brushes are driven by any suitable means such as a rear extension shaft 74 on the motor 38 driving the pulley 75 by the pulley 76 through a belt 77.

The machine operates continuously without interruptions, the fruit being placed or fed into the respective nest bodies at the feed end 78. As the upper strand of the lower chain is driven forward up the slight incline, the caps meet and travel along with the nest bodies until the chains are traveling between the supports and guides where positive cooperation is attained, and the ridges have forced the pit in the fruit to the center in line with the ejection passage 46.

As soon as the bodies and nest caps combine and interlock as indicated at 79, the rollers 61 engage the cam 62, and as the chain travels toward the discharge end, the plungers are slowly forced forwardly, entering the end of the fruit, engaging and centering the follow end of the pit and forcing it through the passage 46 and out through the opening 80 in the front wall.

When the rollers have reached the terminal end of the cam 62, the plungers will project slightly through the passage 46 in the ejection diaphragm, and at that point the rollers come into cooperation with the cam 63, retracting the plungers from the fruits and nests.

As the nests reach the vertical center of the discharge end sprockets, they separate and the lever arm 68 engages the inside cam surface 69 and are depressed thereby, lifting the fingers 66 which lift the pitted fruit from the ridges and thereby freeing them, the lifting fingers maintaining that position until the brushes 70 and 72 have respectively swept the fruit from the nest body and cleaned the nest cap, the fruit being discharged into a suitable container or chute indicated at 71.

Suitable cleansing and sterilizing means is provided for the plungers following each pitting operation, and is illustrated in its simplest form as consisting of a brush or spray head 81 fed by a pipe 82 with hot water or steam, the brush or spray acting as the plungers pass about the discharge end of the machine, though if desired this operation may be carried out on the lower strand of the lower pitting chain, and this sterilizing operation is followed by a cooling and wetting operation through a spray 84 of cold water delivered by the pipe 83, for both, cooling the plungers and wetting them for the next operation. Obviously the sterilizing and wetting arrangement is not limited to the type shown.

It will be noted that the pitting operation is relatively very slow and free from shock and therefore cannot break or crush the pits, while the capacity of the machine is limited only by the speed with which the fruits are placed or fed into the nest bodies. This very slow movement of the plungers is obtained through the sequential follow movement of the plungers operating on about a dozen fruits at any specific instant, the nests being easily loaded with the individual fruits for high capacity. Also the pits are segregated from the pitted fruits.

I claim:

1. A fruit pitting machine comprising an upper and a lower chain having a feed end and a discharge end and each operating over sprockets at the respective ends, and driving means for driving said sprockets for the respective upper and lower chains in opposite directions in unison for cooperation between the respective lower and upper strands of said chains, fruit nests each including a body and a cap with the nest bodies carried by said lower chain and the nest caps carried by said upper chain, and guiding means cooperative with said respective lower and upper strands for aligning and engaging said caps with said bodies for holding single fruits for pitting, a pitting chain operating over sprockets and driven in unison with said lower chain and spaced therefrom, plungers carried by said pitting chain in axial relation to said nests, and cams cooperative with said plungers for advancing said plungers in follow relation for projection through the fruits for ejecting the pits, and for retracting the plungers following ejection of the pits.

2. A structure as defined in claim 1, said fruit nests including a resilient diaphragm at the ejection end and having a passage formed therethrough for passage of the pit while retaining the fruit, with said passage formed in axial alignment with the plunger on the pitting chain.

3. A structure as defined in claim 1, said plungers each comprising a housing fixed to the pitting chain with the plunger slidable therein, a shaft fixed to each plunger and projecting upwardly through a longitudinal slot formed through the top wall of said housing, a roller on said shaft and cooperating with said cams, with said cams supported above in clearing relation to said housings.

4. A structure as defined in claim 1, a lifting finger normally reclined in each nest body and hingedly mounted on said lower chain and having a lever arm, and a cam cooperative with said lever arm at the discharge end of said machine and raising said finger for lifting the pitted fruit out of the nest.

5. A structure as defined in claim 1, the sprockets for the lower chain for the feed end of the machine being located in spaced relation ahead of the sprockets for the upper chain to provide an accessible feeding portion for feeding fruits into the respective nest bodies for pitting.

6. A structure as defined in claim 1, said fruit nests including a resilient diaphragm at the ejection end and having a passage formed therethrough for passage of the pit while retaining the body of the fruit, said passage being formed in axial alignment with the pitting plunger on the pitting chain, said plungers each comprising a housing fixed to the pitting chain with the plungers slidable in the housing, a roller shaft fixed to each plunger and projecting upwardly through a longitudinal slot formed through the top wall of said housing, a roller on said shaft and cooperating with said cams, with said cams supported above and in clearing relation to said housings.

7. A structure as defined in claim 1, said fruit nests each including a resilient diaphragm at the ejection end and having a passage formed in axial alignment with the pitting plunger on the pitting chain, for passage of the pit while retaining the body of the fruit, a lifting finger normally reclined in each nest body and hingedly mounted on said lower chain and having a lever arm, and a cam cooperative with said lever arm at the discharge end of the machine for raising the lifting finger for freeing the fruit from the nest body.

8. A structure as defined in claim 1, said fruit nests including a resilient diaphragm at the ejection end and having a pit discharge passage formed therethrough in axial alignment with the pitting plunger on the pitting chain, said plungers each including a housing mounted on the pitting chain with the pitting plunger slidable in said housing, a roller shaft fixed to each plunger and projecting radially through a longitudinal slot formed in the top wall of said housing, a roller on said shaft and cooperative with said cams, said cams being supported above and in clearing relation to said housings, a lifting finger normally reclined in each nest body and hingedly mounted on said lower chain and having a lever arm, and a cam cooperative with said lever arm at the discharge end of said machine for raising said finger for lifting the pitted fruit free of the nest body.

9. A fruit pitting machine comprising a first lower chain having a feed end and a discharge end and a sprocket for each end, and a shaft for each sprocket, a fruit nest comprising a nest body and a nest cap, with one nest body mounted on each link of said lower chain, said fruit nests each having a resilient wall at one end and having a pit ejection passage, ridges formed longitudinally in said nest bodies and caps for gripping into the sides of the fruit for centering the pit relative to said passage, combined supporting and guiding means for the upper strand of said lower chain for resisting lateral thrust during the pitting operation, an upper chain having a nest cap mounted on each link thereof and operating in synchronism with said first lower chain for securing said nest caps on said nest bodies following the feeding of individual fruits to the selective bodies, and a second lower chain in parallel and operating in the same horizontal plane and spaced from said first lower chain and having a plunger housing mounted on each link of said second chain, and a pitting plunger slidable in the housing in axial alignment with said passage, and means cooperative with said plungers for advancing said plungers to eject the pits from the individual fruits carried by the respective nests and for retracting said plungers following ejection of the pits, with said plungers operating simultaneously in follow relation on a multiplicity of fruits to provide a relatively slow ejection operation to maintain the pits against rupture or crushing.

10. A fruit pitting machine comprising a lower chain having a feed end and a discharge end and a sprocket for each end, and a shaft for each sprocket, a fruit nest comprising a nest body and a nest cap, with one nest body mounted on each link of said lower chain, said fruit nests each having a resilient wall at one end and having a pit ejection passage, ridges formed longitudinally in said nest bodies and caps for gripping into the sides of the fruit for centering the pit relative to said passage, combined supporting and guiding means for the upper strand of said lower chain for resisting lateral thrust during the pitting operation, and including means for securing said nest caps on said nest bodies following the feeding of individual fruits to the selective bodies, and a second chain in parallel and spaced from said lower chain and having a plunger housing mounted on each link of said second chain, and a pitting plunger slidable in each housing in axial alignment with said passage, and means cooperative with said plungers for advancing said plungers to eject the pits from the individual fruits carried by the respective nests and for retracting said plungers following ejection of the pits, with said plungers operating simultaneously in follow relation on a multiplicity of fruits to provide a relatively slow ejection operation to maintain the pits against rupture or crushing, said means for securing said caps to said bodies comprising a sprocket for each end of the machine, an upper chain having said caps mounted on the individual links of said upper chain and operating over said sprockets, and guiding and holddown means cooperative with the upper side of the lower strand of the upper chain and traveling in synchronism in a plane above said lower chain, the feed end sprocket for said upper chain being retracted relative to the feed end sprocket for said lower chain to provide ample access to the nest bodies for feeding the individual fruits thereinto for pitting.

11. A fruit pitting machine comprising two continuous carriers consisting of an upper carrier and a lower carrier vertically spaced, fruit nests having a resilient wall at one end provided with a pit ejection passage, each nest consisting of a body and a cap mounted on the respective lower and upper cariers in spaced cooperative relation, a continuous plunger carrier in laterally spaced relation to said lower carrier and traveling at equal speed, and plunger housings mounted on said plunger carrier in cooperative relation to said nests, and a pitting plunger slidable in each housing in axial alignment with said passages, and means cooperative with said plungers for advancing a plurality of said plungers simultaneously in follow relation for ejecting the pits from the fruits at relatively low speeds and for retracting said plungers following ejection of the pits.

12. A structure as defined in claim 11, said nests each having internal projections for urging into the sides of the fruits for centering the pits relative to the axis of the plunger, for direct ejection of the pits through said passages without rupture or crushing, and said projections having rounded surfaces to prevent rupture or crushing of the skins of the fruits.

13. A structure as defined in claim 11, said carriers each comprising two strands of roller chain with said bodies, caps, and housings spanning the respective pairs of strands and being fixed thereto to form single chains, and spaced sprockets at the respective ends for said chains and driving means therefor, and guiding means for said carriers comprising each an element having spaced grooves for the rollers of said roller chains for maintaining alignment of the individual links and retention against lateral thrust through the pitting operation of said plungers.

14. A structure as defined in claim 11, said means cooperative with said plungers comprising each a shaft fixed radially in said plunger and operating through a slot formed through the top wall of said housing and having a roller rotatable thereon, and cams and support means therefor, said cams being supported in clearing relation above said housings and being cooperative with said roller for advancing said plunger for ejection of the pit and for retracting said plunger following ejection of the pit.

15. A structure as defined in claim 11, a lifting finger operable in each nest body and normally in a reclined position therein, and a cam cooperative with said lifting finger for raising said finger for lifting the fruit free of the body of the nest.

16. A structure as defined in claim 11, said nests each having internal projections for urging into the sides of the fruit for centering the pit relative to the axis of the plunger for direct ejection of the pit through the passage, and said projections having rounded surfaces for maintaining the skin of the fruit against rupture, said carriers each comprising two strands of roller chain with said bodies, caps, and housings spanning the respective pairs of strands and being fixed thereto and thereby forming single chains, and spaced sprockets for the respective ends of said chain and driving means therefor, and guiding means for said carriers comprising each a plate having spaced grooves for the rollers of said roller chains for maintaining alignment of the individual links and retention against lateral thrust during the pitting operation.

17. A fruit pitting machine comprising, two lower chains in parallel and operating in substantially the same horizontal plane and laterally spaced, an upper chain operating in the same vertical plane with one of said lower chains, and driving means for driving said chains in unison, individual fruit holders comprising each a body and a cap each including internal projections for centering the pits in the fruits, with the bodies mounted on said one of said lower chains, with the caps mounted on said upper chain for cooperation with said bodies, and pitting plungers slidably mounted on the other one of said lower chains, means cooperative with said pitting plungers for advancing said plungers for forcing the pits out of the fruits and for retracting said plungers following ejection of the pits, said means cooperative simultaneously advancing a plurality of plungers in follow relation for relatively slow movement in forcing the pits out of the fruits to prevent crushing of the pits.

18. A fruit pitting machine comprising two chains in parallel and operating in substantially the same plane and laterally spaced, and driving means for driving said chains in unison, individual fruit holders mounted on one of said chains, and pitting plungers slidably mounted on the other chain, means cooperative with said pitting plungers for advancing said plungers for forcing the pits out of the fruits and for retracting said plungers following ejection of the pits, said means cooperative simultaneously advancing a plurality of plungers in follow relation for relatively slow movement in forcing the pits out of the fruits to prevent crushing of the pits, a third chain spaced above said one of said chains, said individual fruit holders each consisting of a body and a cap, with the bodies mounted on said one of said chains, and said caps mounted on said third chain for cooperation following the placing of the individual fruits in the respective bodies to grip the fruit for the pitting operation, and including holddown and guiding means for the third chain and support and guiding means for the said one of said chains for retention against the action of the pitting plungers.

19. A structure as defined in claim 18, internal projections in said individual fruit holders for operation in the sides of the fruit for centering the pit in axial alignment with the pitting plungers, and said pitting plungers having cupped ends for centering the adjacent end of the pit for direct forcing of the pit through the fruit.

20. A structure as defined in claim 19, lifting means in each nest and means cooperative therewith following ejection of a pit for lifting the pitted fruit free of said projections, and discharge means comprising a rotary brush and driving means therefor for discharging the pitted fruit from the nest following freeing of the fruit from the projections.

References Cited in the file of this patent

UNITED STATES PATENTS 1,329,023    Scott                   Jan. 27, 1920